Feb. 20, 1934.                C. MILLER                1,947,789
            APPARATUS FOR REMOVING OIL FROM THERMATOMIC CARBON
                    Filed Nov. 3, 1930           2 Sheets-Sheet 1
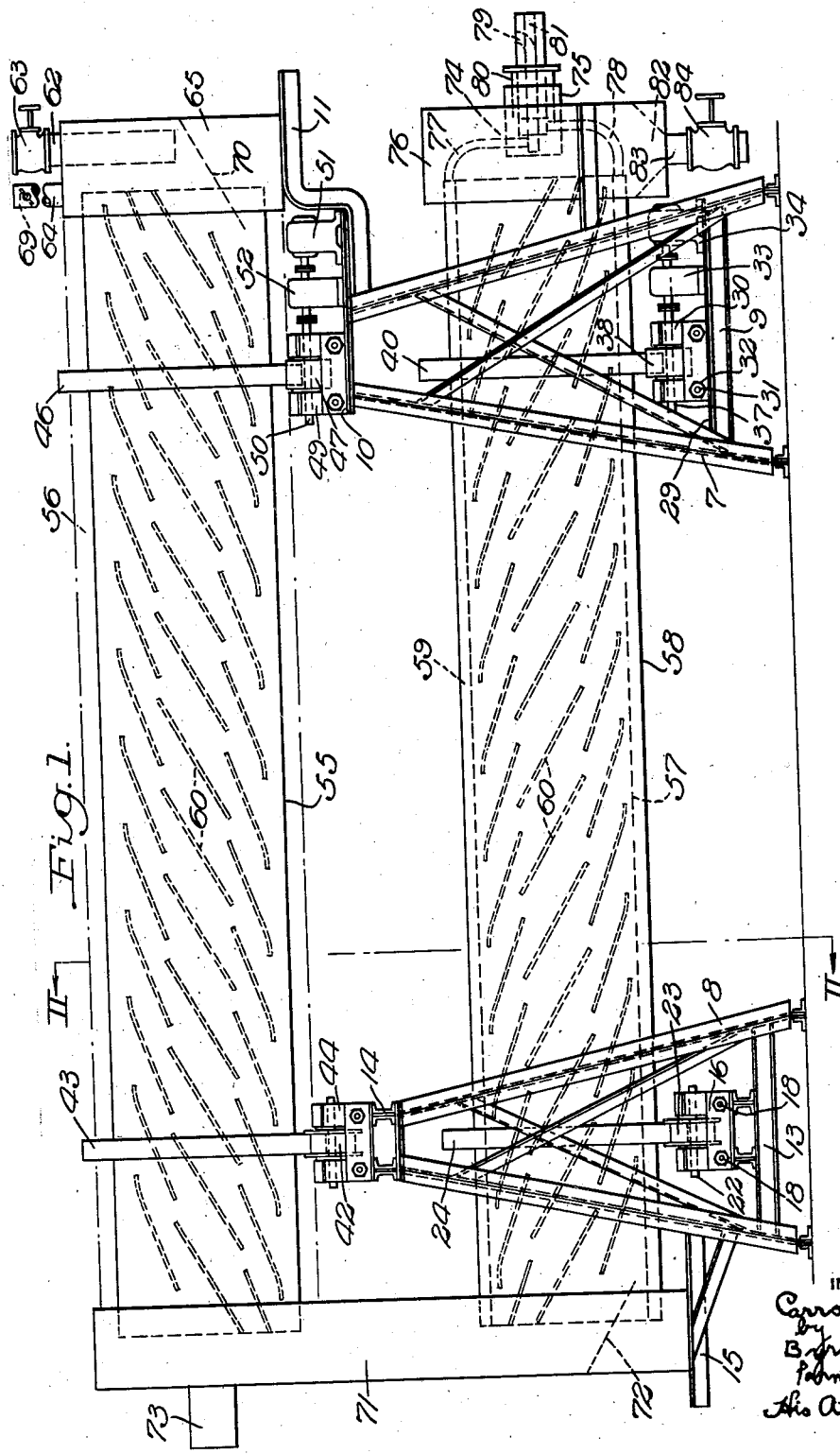

Feb. 20, 1934.        C. MILLER        1,947,789
APPARATUS FOR REMOVING OIL FROM THERMATOMIC CARBON
Filed Nov. 3, 1930        2 Sheets-Sheet 2
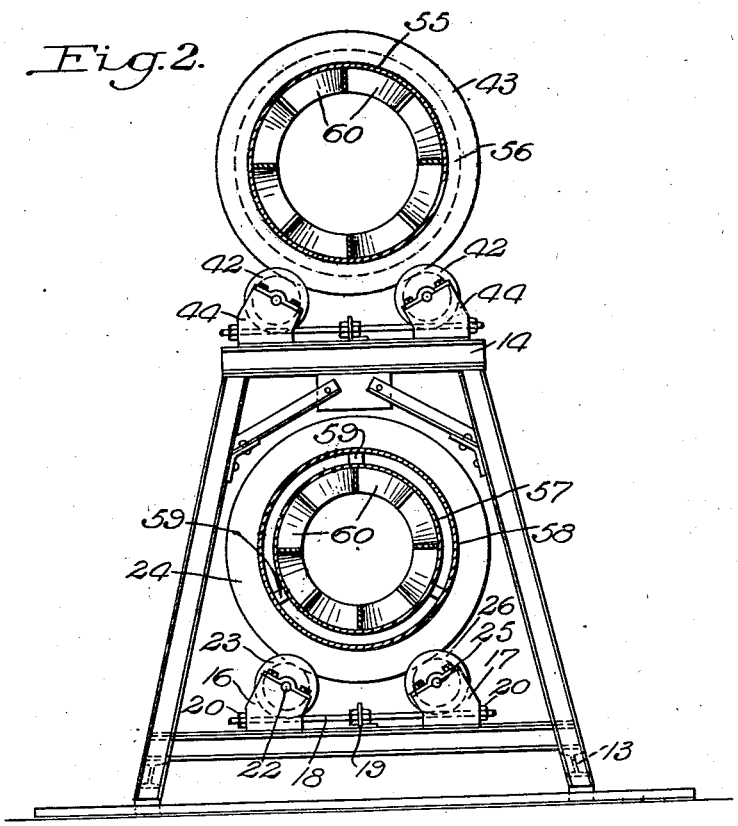
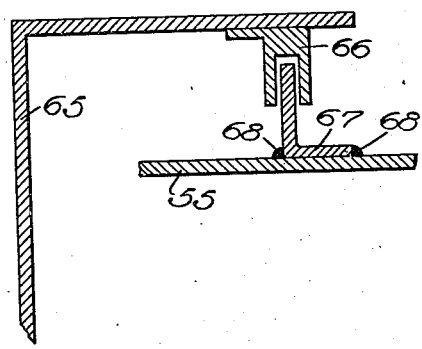
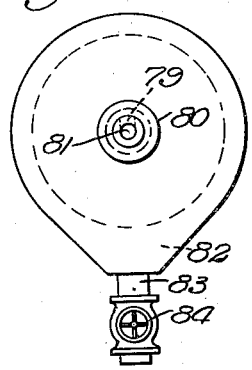
INVENTOR
Carroll Miller
by Byrnes, Stebbins, Parmelee & Blenko
His Attorneys Patented Feb. 20, 1934

1,947,789

UNITED STATES PATENT OFFICE 1,947,789

APPARATUS FOR REMOVING OIL FROM THERMATOMIC CARBON

Carroll Miller, Pittsburgh, Pa., assignor to Thermatomic Carbon Company, Pittsburgh, Pa., a corporation of Delaware Application November 3, 1930. Serial No. 493,029

6 Claims. (Cl. 263—32)

My invention relates to the calcining or drying of powdery material. My invention relates to apparatus which is suitable for calcining or drying powdery material. Inasmuch as I made my invention in the course of my experiments and studies relating to carbon blacks, I have chosen this substance to be referred to for the purpose of explaining a use of my improved apparatus. I have furthermore disclosed in the drawings, and will describe in this specification, one form of apparatus illustrative of my invention. It is to be understood, however, that my invention is not thus limited; but that certain aspects of the same are broadly applicable to various powdery materials; and that other embodiments of the apparatus may be employed which incorporate the principles of my invention.

In the manufacture of carbon blacks, such as the soft carbons which are sold under the trademark "Thermatomic Carbons", certain volatile substances, such as oils, become coated on the carbons. While these volatile substances are not detrimental to the manufacture of rubber tires or other rubber articles which are to be black in color when finished, there are certain articles manufactured of rubber containing carbon blacks which are not so pleasing in appearance when the carbon blacks used in their manufacture contain the type of substances, such as oils, which have been above referred to. For instance, a white portion of the rubber article may have a smeary appearance due to the presence in the carbon blacks of the oil or the like.

Accordingly, I propose in accordance with the principles of my invention to remove the major portion of the volatile substances contained in powdery materials, such as carbon blacks. One object of my invention is to provide means to so carry on the process of driving off volatile oils or the like from carbon blacks that the physical characteristics and properties of the carbon, when compounded with rubber, shall not be detrimentally affected. A more specific object of my invention is to provide means for driving off volatile oils or the like from carbon black, in such manner that oxidation of the carbon blacks themselves is prevented. A further object of my invention is to provide suitable calcining or drying apparatus for powdery material which permits such treatment of the material to be carried on while excluding air. A more specific object of my invention is to provide calcining or drying apparatus so arranged that the entrance of air is prevented, and that one section of the apparatus is arranged for subjecting the powdery material being treated to hot gaseous combustion products, and a second section of the apparatus is arranged for cooling the powdery material. Further objects of my invention will become apparent in the course of the ensuing description, and will be more particularly pointed out in the accompanying claims.

In the drawings in which, for purposes of illustration and not as limiting my invention, I have shown one form of calcining or drying apparatus which may be used for removing volatile substances from powdery material, Fig. 1 is a somewhat diagrammatic view in side elevation of the calcining or drying apparatus;

Fig. 2 is a cross-section on the line II—II of Fig. 1, the insulation 56 being represented merely by a broken line as in Fig. 1 in order that the cylinder 55 may be more clearly seen;

Fig. 3 is a detailed sectional view of the enclosing means and the manner in which th same is connected to the rotatable portion of the apparatus so as to prevent leakage of gases relative thereto under the intended conditions of operation;

Fig. 4 is an end view of the discharge means.

In one use of the embodiment of my invention which I have chosen for the purpose of explaining the principles thereof, carbon black is to be treated so as to remove the major portion of the volatile substances, such as oil, which are contained therein when obtained from the carbon producing apparatus. The carbon black is extremely fine, being submicroscopic in size. Its affinity for oxygen is, under normal circumstances, dependent upon its temperature. In order to drive off the volatile substances which may lead to discoloration of the rubber products in which the carbon blacks have been incorporated, I wish to heat these carbon blacks to a sufficiently high temperature to volatilize and drive off the substances. Injury might be done to the carbon blacks at this high temperature if sufficient oxygen or oxidizing gases or substances were present. Accordingly, my improved process for driving off the volatile oils or the like from carbon black comprises, first, the step of subjecting the carbon black to gases at an elevated temperature which are of such a nature as not to oxidize the carbon black. I then cool the carbon black in an atmosphere which is non-oxidizing. At ordinary temperatures, the carbon black may be freely handled in the air without detriment from the oxygen in the air.

As a simple manner of carrying out these principles, I subject the carbon black directly to the hot gaseous products of combustion from a burner to which air and fuel gas is supplied. I so proportion the amounts of air and fuel gas as to maintain the hot gaseous products of combustion non-oxidizing. The carbon blacks are then cooled in an atmosphere which is maintained at a relatively cool temperature and which is non-oxidizing in character. In order to obtain hot gaseous products of combustion which are non-oxidizing, I supply no more oxygen to the burner than an amount sufficient for complete combustion of the fuel gas, and preferably an amount insufficient for complete combustion thereof.

Although the process which I have just described may be carried out in other forms of apparatus than the one disclosed in the drawings, I find that excellent results are obtained by using apparatus of the type illustrated.

As shown in Fig. 1, the drying or calcining is to be carried on in rotatably mounted cylindrical means. By rotating this cylindrical means, the powdery material is tumbled over and over, and gradually makes its way longitudinally thereof. In one portion of the cylindrical means the powdery material is subjected to a heat treatment in a non-oxidizing atmosphere; and in a subsequent portion of the cylindrical means the powdery material is cooled by a relatively cool atmosphere which is non-oxidizing. The cylindrical means may be separated into two units as is the embodiment shown in the drawings.

My improved calcining apparatus provides spaced frames 7 and 8 for supporting the cylindrical means. The frame 7 includes a lower platform 9, an upper platform 10 and a shelf 11 formed as an extension in a slightly higher plane of the platform 10. The frame 8 includes a lower platform 13, an upper platform 14, and a shelf 15 supported on the side of the frame 8.

Spaced housings 16 and 17 are slidable toward and away from each other on the platform 13, as illustrated in Fig. 2. Rods 18 are centrally secured at 19 to the platform 13 and are received in bores in the housing members 16 and 17. The end portions of the rods 18 are threaded; and nuts 20 cooperate with these threaded portions to draw the housing members 16 and 17 toward the center of the platform. It is apparent, therefore, that by means of the nuts 20, the housing members 16 and 17 may be adjusted toward and away from each other. Accordingly, by drawing up the nuts at both ends of the rods 18, the axis of the cylindrical means may be elevated or lowered, while the axis of the cylindrical means may be shifted laterally by drawing up the nuts 20 on one side more than on the other side.

In the pair of housings 16 is rotatably mounted a shaft 22, this shaft carrying a flanged roller 23. A tire 24 is secured to the cylindrical means at this point, and the flanged roller 23 cooperates with the tire 24 to rotatably support the cylindrical means. In a similar manner, a shaft 25 is rotatably mounted in the housing members 17, and this shaft carries a flanged roller 26. It is obvious that the flanges of the rollers 23 and 26 prevent sidewise displacement of the tire 24; and accordingly the cylindrical means, while rotatably supported, cannot move in an axial direction relative to the flanged rollers 23 and 26.

On the platform 9 is slidably supported a plate 29. On the plate 29 is mounted a pair of spaced housings 30 similar to the housings 16 and 17. It will be understood that a similar pair of housings are mounted on the platform 9 opposite the housings 30 so as to cooperate therewith in the same manner. Rods 31 extend through bores in the housings, and nuts 32 are provided for adjusting the pairs of housings toward or away from each other similarly as has been described in connection with Fig. 2. On the plate 29 is also mounted a gear reduction 33 and a motor 34. The motor 34 is connected to the gear reduction 33 by flexible coupling and the gear reduction 33 is connected to a shaft 37 by a flexible coupling. The shaft 37 is rotatably mounted in the pair of housings 30. A smooth roller 38 is secured on the shaft 37 intermediate the housings 30. Accordingly, the roller 38 is driven at a reduced speed through the gear reduction 33 by the motor 34. A similar smooth roller will be mounted on a shaft rotatably carried by the opposite pair of housings. A tire 40 is secured to the cylindrical means at this point and cooperates with the smooth rollers above referred to so as to rotatably support the cylindrical means. The frictional contact between the smooth roller 38 and tire 40 provides a yielding driving connection between cylindrical means and the motor 34.

Where the cylindrical means is all in one unit, the tires 24 and 40, together with the flanged rollers 23 and 26, and the pair of smooth rollers 38 suffice to rotatably support the cylindrical means. In the embodiment shown in Fig. 1, the cylindrical means is in two units, one of these units being above the other. On the platform 14 are arranged flanged rollers 42 similarly supported as the pair of flanged rollers 23 and 26. The pair of flanged rollers 42 cooperate with a tire 43 to rotatably support the upper unit of the dryer, and are rotatably supported in housing members 44 which are adjustable toward and away from each other similarly as the housing members 16 and 17.

A tire 46 surrounds the upper unit adjacent its other end, this tire being rotatably supported and driven by smooth rollers 47 mounted on shafts which are rotatably supported in housings 49. One of these shafts numbered 50, shown in Fig. 1, is driven from a motor 51 through a gear reduction 52. Flexible couplings connect the motor to the gear reduction and the gear reduction to the shaft 50.

In the embodiment disclosed in the drawings, the upper section operates to volatilize the oil or other coating on the combustible powdery material which is being treated; and the lower section cools the powdery material without permitting the same to come in contact with an oxidizing atmosphere. For convenience, the upper section may be termed a "calcining apparatus" or a "kiln"; and the lower section may be termed a "cooling apparatus". I prefer to perform the two operations in separate cylinders, one of which is heated, and the other of which is water jacketed. In order that the powdery material may not become oxidized during the calcining, I prefer to exclude oxidizing gases or substances from the interior of the calcining apparatus or kiln. In the embodiment disclosed, the kiln is in the form of a metal cylinder 55 which may, if desired, be encased with insulation 56, represented in Figs. 1 and 2 by broken lines so that the cylinder 55 itself may be more clearly seen. The cooling apparatus shown in the drawings is in like manner rotatably supported, the powdery material being cooled as it passes longitudinally of a metal cylinder 57 which is surrounded by another cylinder 58 which is spaced therefrom to provide a water jacket. Spacing means 59 are shown in Fig 2. Each of the units is provided internally with lifters 60 which cause the powdery material to make its way longitudinally of the units, although the same rotate on horizontal axes. These lifters 60 are arranged at a slight angle to a generating line of the cylinder; and are arranged spirally in the manner indicated at Figs. 1 and 2. Accordingly, when the units are rotated, the powdery material is tumbled over and over and gradually makes its way from the inlet to the discharge end of the unit.

In order to deliver powdery material to the inlet end of the kiln, I provide a conduit 62 which is controlled by a valve 63 so that the feeding of powdery material into the kiln may take place as desired. The hot gases which are used for treating the powdery material in the kiln are discharged through a vent conduit 64 which is controlled by a damper 69. Both of these conduits extend through enclosing means 65 which are arranged to prevent leakage of air into the end of the kiln. The four ends of the two units are all enclosed so that the leakage of air into the apparatus at any point is guarded against. The manner in which the enclosing means at each of the ends is connected to the rotating cylindrical means is illustrated in Fig. 3. A portion of the enclosing means 65 has been chosen to illustrate how this is accomplished. An annular channel member 66 is carried by the enclosing means 65, being riveted or otherwise secured thereto. An angle iron 67 which is likewise annular in form surrounds the cylinder 55, being welded thereto as indicated at 68. The outwardly extending flange of the angle iron 67 is received within the groove of the channel member 66. This permits relative rotation between the cylinder 55 and the enclosing means 65 while preventing the ready flow of air or other gases past the connection thus afforded by the channel member 66 and the angle iron 67. Were the pressure within the rotating cylindrical means below atmospheric pressure at an end thereof, there would be a tendency for air to seep in past the connection afforded by the interengaging members 66 and 67. The continuous supply of gaseous combustion products to the interior of the cylindrical means maintains the pressure within the same above atmospheric pressure if there is not too great a draft up the conduit 64. The venting of gases by way of the conduit 64 should, accordingly, be so controlled by the damper 69 as to maintain the pressure in the cylindrical means slightly above atmospheric pressure. This will bring about a tendency for gases to leak out between interengaging members 66 and 67, instead of in.

A baffle plate 70 is arranged beneath the outlet of the conduit 62 to direct the powdery material into the inlet end of the cylinder 55 of the kiln. The other end of the kiln is enclosed by a casing 71 which likewise encloses the inlet end of the cooling apparatus. The discharge end of the kiln is at a higher elevation than the inlet end of the cooling apparatus. Accordingly, as the powdery material is discharged from the kiln, it is directed into the inlet end of the cooling apparatus by a baffle 72.

A burner 73 extends through the enclosing means 71 so as to supply hot gaseous products of combustion to the kiln. As has above been explained, the burner is so adjusted that no excess of oxygen is supplied for the combustion of the fuel; and accordingly the gaseous products of combustion are maintained non-oxidizing. I prefer to supply insufficient oxygen for complete combustion of the fuel gas so as to ensure that the hot gaseous products of combustion shall be non-oxidizing. It is obvious that in place of the burner for fuel gas 73 other suitable apparatus for burning a fuel and delivering the hot gaseous products of combustion to the kiln may be substituted. Since the pressure within the cylindrical means is maintained high enough so that air does not make its way into either unit, and since the burner 73 is so controlled that the gaseous products of combustion are non-oxidizing, the atmosphere in both units will be substantially non-oxidizing.

The powdery material, if it is carbon black which is to be treated to remove the adherent oil or the like, should be heated to a sufficiently high temperature to volatilize the same. This may be accomplished without raising the carbon to its kindling temperature. Even though the carbon black should be raised to its kindling temperature, there is no possibility of combustion, since the atmosphere in which the calcining takes place is non-oxidizing. The atmosphere in the cooling apparatus is likewise non-oxidizing and, therefore, the temperature of the powdery material, whether carbon black or some other combustible powdery material, is reduced below its kindling temperature before it is discharged from the apparatus. The cylinder 58 provides a jacket surrounding the cylinder 57 through which cooling water may be circulated. In order to supply and discharge this cooling fluid to and from the water jacket of the cooling apparatus, I provide a spider generally indicated by the numeral 74. The hub 75 of this spider extends through the enclosing means 76 which cooperates with the discharge end of the cooling apparatus. A passageway 77 is provided by an arm of the spider so as to deliver cooling fluid to the water jacket of the cooling apparatus, and a discharge conduit 78 is provided by another arm of the spider. Connections 79 and 81 are provided by a non-rotatable portion of the spider to which the supply and discharge pipes may be connected. A gland 80 is provided to permit rotation of one portion of the spider relative to the other while maintaining communication between the supply and discharge pipes and the conduits 77 and 78. Baffles or partitions may be provided in the water jacket of the cooling apparatus to cause circulation of the water or other cooling fluid throughout the cooling jacket.

The enclosing means 76 is formed in its lower portion as a bin 82 connected to a discharge conduit 83. The latter is controlled by a valve 84 so that the discharge of the calcined material into a bin or into sacks may be controlled without removing an appreciable amount of gas. It is thus obvious that in this mode of operation, in which the material is removed without undue loss of gas, the atmosphere in the cooling cylinder is maintained in a substantially static condition. The advantages of such a procedure are apparent.

My improved apparatus provides for calcining or drying powdery material which is combustible; and has the advantage that the powdery material cannot become ignited, since the treatment, including the cooling of the powdery material, takes place in a non-oxidizing atmosphere. My improved apparatus includes means for rotatably supporting the same which has the advantage that, although the kiln or the cooling apparatus may vary considerably in length, this extension or contraction is taken care of so that no strain is placed upon the driving means. My apparatus has the further advantage that the cylindrical means may be rotated on a substantially horizontal axis, and at the same time, the powdery material will be fed longitudinally thereof so as to move continuously toward the discharge point. My improved apparatus provides for removing the volatile material which coats or adheres to the powdery material without having a detrimental effect upon the powdery material itself.

While I have illustrated and described one specific form of apparatus for removing volatile substances from a volatile material, it will be understood that the invention is not restricted to the particular construction and arrangements shown, nor to the specific steps of the process described, but may be variously modified within the contemplation of the invention and under the scope of the following claims.

I claim:

1. A dryer having a rotatable elongated chamber, a cooling jacket for the walls of said chamber, a spider at one end of said chamber, said spider having a stationary portion providing a conduit for supplying cooling fluid to the cooling jacket and a conduit for discharging fluid therefrom, means for supplying cooling fluid to the spider, and means for rotating said chamber and spider.

2. A dryer having a rotatable elongated chamber, a cooling jacket for the walls of said chamber, a spider at one end of said chamber, said spider having a stationary portion providing a conduit for supplying cooling fluid to the cooling jacket and a conduit for discharging fluid therefrom, stationary enclosing means receiving the material from the rotatable chamber, a conduit extending through said enclosing means for supplying cooling fluid to the spider, and means for rotating said chamber and spider.

3. In combination, a rotatably mounted heating cylinder and a rotatably mounted jacketed cooling cylinder, means at the discharge end of said heating cylinder for supplying hot gaseous products of combustion, means at the charging end of said heating cylinder for removing said gaseous products of combustion, said means including a flow control whereby a positive gas pressure may be maintained in said heating and cooling cylinders, means at the discharge end of said heating cylinder for conducting the discharged material into the charging end of said cooling cylinder, said means also serving as a gas conduit between said heating cylinder and said cooling cylinder, and means at the discharge end of said cooling cylinder for removing the treated material without removing an appreciable quantity of gas, whereby the gaseous atmosphere in said cooling cylinder may be maintained in a substantially static state.

4. In combination, a rotary calciner and a water jacketed cooler, means at the discharge end of said calciner for supplying hot gaseous products of combustion, means at the charging end of said calciner for removing said gaseous products of combustion, said means including a flue and damper whereby a positive gas pressure may be maintained in said calciner and cooler, means at the discharge end of said calciner for conducting the discharged material into the charging end of said water jacketed cooler, said means also serving as a gas conduit between said calciner and cooler, and means at the discharge end of said cooler for removing the treated material without removing an appreciable quantity of gas, whereby the gaseous atmosphere in said cooler may be maintained in a substantially static state.

5. In combination, a rotatably mounted cylinder, heating means for said cylinder, a second rotatably mounted cylinder, cooling means for said second cylinder, means for introducing a non-oxidizing gaseous mixture into said heating cylinder, means for removing said non-oxidizing gaseous mixture from said heated cylinder, said means including a flow control whereby a positive gas pressure may be maintained in said heating and cooling cylinders, means at the discharge end of said heating cylinder for conducting the discharged material into the charging end of said cooling cylinder, said means also serving as a gas conduit between said heating cylinder and said cooling cylinder, and means at the discharge end of said cooling cylinder for removing the treated material without removing an appreciable quantity of gas, whereby the gaseous atmosphere in said cooling cylinder may be maintained in a substantially static state.

6. In combination, a rotary calciner, heating means for said calciner, a rotary drum cooler, cooling means for said rotary cooler, means for introducing a non-oxidizing gaseous mixture into said calciner, means for removing said non-oxidizing gaseous mixture from said calciner, said means including a flue and damper whereby a positive gas pressure may be maintained in said calciner and cooler, means at the discharge end of said calciner for conducting the discharged material into the charging end of said cooler, said means also serving as a gas conduit between said calciner and said cooler, and means at the discharge end of said cooler for removing the treated material without removing an appreciable quantity of gas, whereby the gaseous atmosphere in said cooler may be maintained in a substantially static state.

CARROLL MILLER.